Jan. 24, 1956
L. M. MINSK ET AL
2,732,297
DECORATING CERAMIC OBJECTS
Filed Oct. 1, 1952
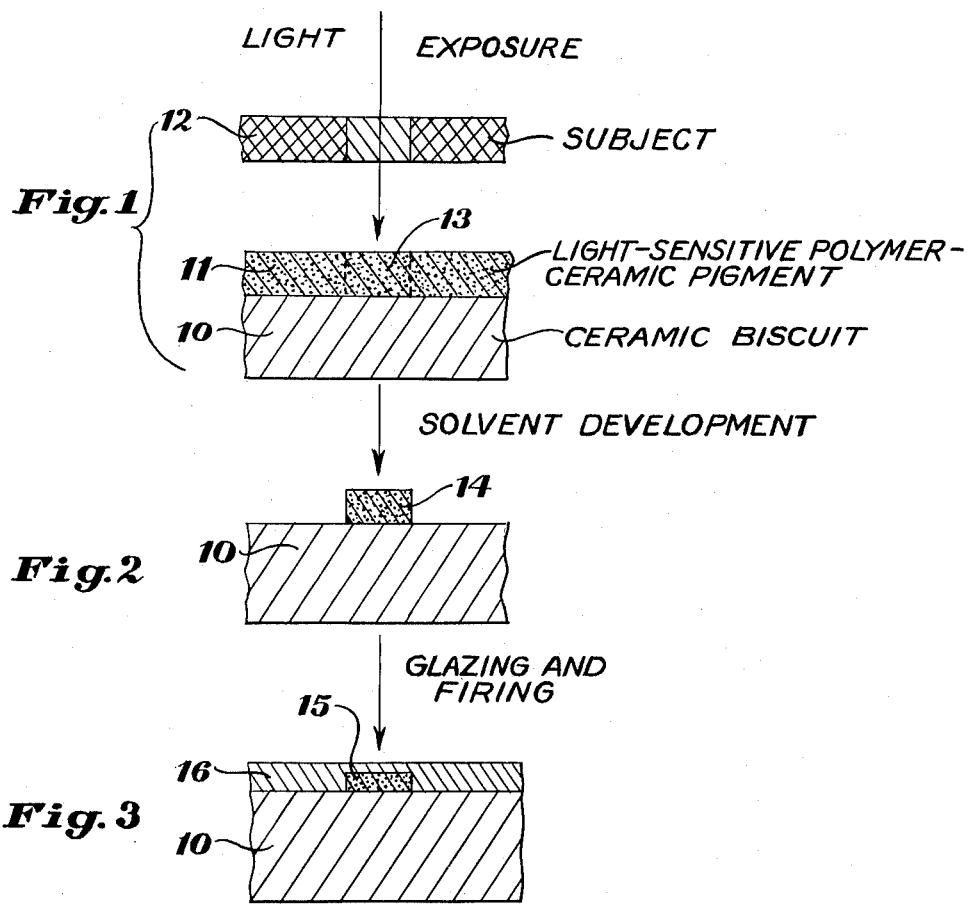
Louis M. Minsk
Werter P. Van Deusen
INVENTORS
BY
ATTY. & AGT.

United States Patent Office 2,732,297
Patented Jan. 24, 1956

2,732,297
DECORATING CERAMIC OBJECTS

Louis M. Minsk and Werter P. Van Deusen, Rochester, N. Y., assignors to Eastman Kodak Company, Rochester, N. Y., a corporation of New Jersey Application October 1, 1952, Serial No. 312,474

3 Claims. (Cl. 95—5.5)

This application is a continuation-in-part of our U. S. patent application Serial No. 207,048 filed January 20, 1951, now Patent No. 2,690,966, which is a continuation-in-part of our U. S. patent application Serial No. 58,084, filed November 3, 1948, now abandoned.

This invention relates to the decoration of ceramic objects by the use of light-sensitive pigmented resinous compositions.

In our above applications are disclosed compositions containing mixtures of pigments or dyes and certain light-sensitive polymer components. These compositions were disclosed as useful for the formation of colored relief images on various supports such as ceramic biscuits. We have now discovered additional light-sensitive polymers which are particularly efficacious for use in the decoration of ceramic objects.

In Figures 1 to 3 of the accompanying drawings are shown in greatly enlarged cross-sectional view the appearance of the ceramic objects at various stages in the preparation of an under-glazed decoration on a ceramic biscuit.

The polymers contemplated by our invention for use in the pigmented compositions for the decoration of ceramic ware are synthetic polymers having combined polymeric units containing groups of structure

R—CR=CH—CO— wherein R represents either an alkyl group, such as methyl or ethyl, preferably containing 1 to 4 carbon atoms, or a mononuclear aryl group, e. g. phenyl, anisyl, etc.

The preferred polymers are those containing combined polymeric units having groups of the structure

R—CH=CH—CO— in which R is an aryl group as above mentioned.

Particularly efficacious polymers under the above general formulas are the polyvinyl alcohol esters of cinnamic acids such as cinnamic acid and m-nitrocinnamic acid. These polymers contain combined polymeric units of structure

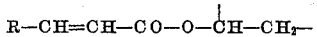

R—CH=CH—CO—O—CH—CH₂— in which R is an aryl group as above. The polymers are preferably made by reacting polyvinyl alcohol with cinnamoyl halides as described in our above mentioned applications. For example, the polymer obtained by substantially fully esterifying polyvinyl alcohol with cinnamoyl chloride and containing about 100 mol percent of combined vinyl cinnamate groups is particularly useful in our invention. Similarly useful polymers having groups of the formula immediately above in which R is an alkyl group are obtained by reacting polyvinyl alcohol with the desired unsaturated aliphatic acid halide such as crotonyl chloride to obtain an ester of polyvinyl alcohol.

Useful polymers having structures falling under the two first mentioned general formulas above are polymers such as those obtained by reacting polymers containing acetyl groups with aromatic aldehydes as disclosed in the Unruh et al. U. S. patent application Serial Nos. 246,515, 246,516, and 246,517, filed September 13, 1951, the last one now Patent No. 2,706,725. A typical polymer of this type is that obtained by acetylating polystyrene and condensing the acetyl groups of the resultant polymer with benzaldehyde, anisaldehyde, etc. to obtain a vinyl benzalacetophenone polymer having polymeric units of structure

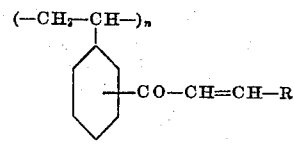

Similarly, methyl vinyl ketone polymers condensed with aromatic aldehydes to obtain polymers having the units

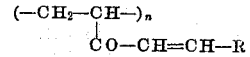

are very useful in our invention.

Other polymers contemplated for use in the light-sensitive pigmented compositions are those disclosed in the Allen et al. U. S. Patent 2,566,302 granted September 4, 1951. These resins are made by cinnamoylating styrene polymers with, for example, cinnamoyl chloride in a Friedel-Crafts reaction.

In addition to containing the polymeric constituents above mentioned the pigmented compositions preferably but not necessarily contain a light-sensitizing agent such as nitro compounds, triphenylmethane dyes, anthrones, quinones, or ketones such as disclosed in the Minsk et al. U. S. patent application Serial Nos. 148,684, filed March 9, 1950, now U. S. Patent 2,610,120, and Serial Nos. 207,048–51, filed January 20, 1951, now Patent Nos. 2,690,966 and 2,670,285–287, respectively, e. g. picramide, 1,2-benzanthraquinone, crystal violet carbinol base or 4,4'-tetramethyldiaminodiphenylketone.

The ceramic pigment component of the compositions used for decorating the ceramic biscuit are those known in the art such as emerald green, titanium oxide, cobalt blue, yellow ochre, cobalt carbonate, or many insoluble copper, nickel, uranium or manganese compounds in as concentrated a form as possible. Accordingly, a pigment can be selected for use in the composition as desired provided it remains colored after firing whether this be white, black or other colors. The lighter colors and white may be used on dark colored backgrounds.

The following is a representative composition of our invention:

| | |
|---|---|
| Ethyleneglycol monomethyl ether acetate_____cc___ | 100 |
| Polyvinylcinnamate (100 percent esterified) grams___ | 7.5 |
| Ceramic pigment_____do____ | 30 |
| Sensitizer _____do____ | 0.75 |

In preparing the pigmented coating composition, the pigment is merely milled in the solvent solution of the polymer in a suitable manner as in a pebble or ball mill. In use, the composition is sprayed or spread on to a suitable ceramic biscuit and after the solvent has been volatilized from the coating it is exposed under the design to be reproduced on the ceramic biscuit. Exposure to light under the design renders the polymer in only the exposed region of the coating insoluble in the solvents in which the original polymer was soluble. A typical exposure is one minute at 18 inches from a Creco 35-ampere arc. Accordingly, when a solvent such as a mixture of xylene and ethylene glycol monomethyl ether acetate (4:1) is applied to the coating the pigmented polymer in the unexposed regions dissolves and is thus removed from the ceramic biscuit. This leaves insoluble pigmented polymer in the exposed areas of the biscuit. If the original coating composition contained an overglaze pigment and was coated on glazed ware, firing may proceed immediately after removal of the unexposed areas with solvent. When underglaze pigments have been used in the coating composition, following the solvent treating step, an overglaze is applied to the ceramic biscuit carrying the pigmented polymeric image and the product is then fired in the usual manner. This latter process is shown in the accompanying drawings wherein Fig. 1 shows exposing the light-sensitive pigmented layer 11 on the ceramic biscuit 10 to the subject 12 with the result that light insolubilizes the light-sensitive coating in the region 13. As shown in Fig. 2 when suitable organic solvent is applied to the exposed coating, the region not insolubilized by exposure to light is washed away leaving the polymer-pigment image 14 on the biscuit 10. After applying a suitable overglaze to the element of Fig. 2 and firing, the decorated biscuit appears substantially as shown in Fig. 3, the biscuit 10 carrying the fired design 15 and overglaze 16. The favorable results of this procedure were quite unexpected inasmuch as it had been supposed that it would be necessary to first form the polymer-pigment image as in Fig. 2, then fire, apply overglaze and fire again, in order to prevent destruction of the glaze above the polymer-pigment image. Accordingly, while the first firing step can be used it is not essential.

In the manner of the above example our invention can be applied to the decoration of various other vitreous and metallic surfaces, e. g. of measuring vessels, stove parts, plates, pots, kitchen cabinets and tables, trays, bathtubs, chemical tanks and the like.

We claim:

1. A method for decorating ceramic ware which comprises coating a ceramic biscuit with a resinous coating containing a mixture of a ceramic pigment which will be colored after firing and a light-sensitive synthetic polymer having combined polymeric units of structure $$R-CH=CH-CO-O-\overset{|}{C}H-CH_2-$$

wherein R represents a mononuclear aryl group of the benzene series, exposing the coating to an image to render only the exposed region insoluble in organic solvents in which the unexposed region is soluble, removing only the unexposed region of the coating with an organic solvent, and glazing and firing the biscuit.

2. A method for decorating ceramic ware which comprises coating a ceramic biscuit with a resinous coating containing a mixture of a ceramic pigment which will be colored after firing and a light-sensitive synthetic polymer having combined polymeric units of structure $$C_6H_5-CH=CH-CO-O-\overset{|}{C}H-CH_2-$$

exposing the coating to an image to render only the exposed region insoluble in organic solvents in which the unexposed region is soluble, removing only the unexposed region of the coating with an organic solvent, and glazing and firing the biscuit.

3. A method for decorating ceramic ware which comprises coating a ceramic biscuit with a resinous coating of a mixture of a ceramic pigment which will be colored after firing and substantially fully esterified cinnamic acid ester of polyvinyl alcohol, exposing the coating to an image to render only the exposed region insoluble in organic solvents in which the unexposed region is soluble, removing only the unexposed region of the coating with an organic solvent, and glazing and firing the biscuit.

References Cited in the file of this patent

UNITED STATES PATENTS

| | | |
|---|---|---|
| 223,762 | Salvy | Jan. 20, 1880 |
| 1,965,710 | Murray | July 10, 1934 |
| 2,063,348 | Seymour | Dec. 8, 1936 |
| 2,118,864 | Reppe | May 31, 1938 |
| 2,195,362 | Ellis | Mar. 26, 1940 |
| 2,332,896 | D'Alelio | Oct. 26, 1943 |
| 2,472,128 | Staehle | June 7, 1949 |
| 2,610,120 | Minsk et al. | Sept. 9, 1952 |

FOREIGN PATENTS

| | | |
|---|---|---|
| 7,800 | Great Britain | Jan. 6, 1910 |